(No Model.)
C. H. IRWIN.
AUGER BIT.
No. 361,522. Patented Apr. 19, 1887.
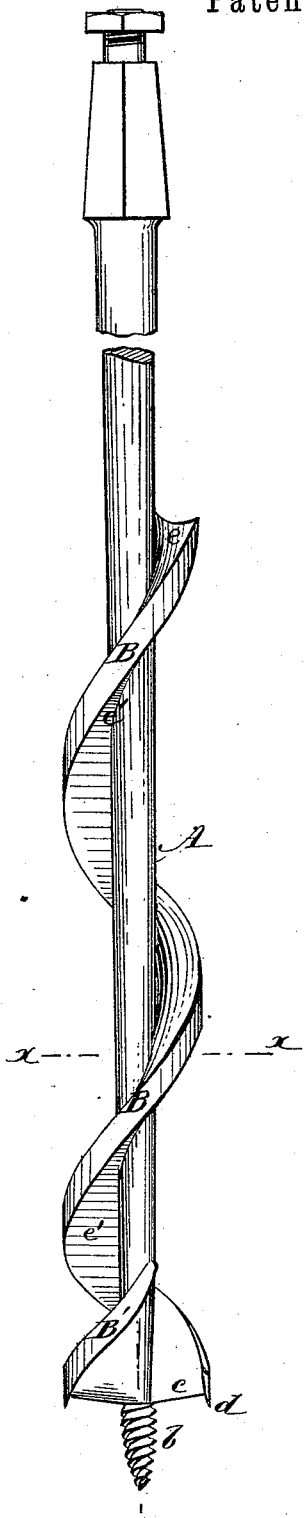

UNITED STATES PATENT OFFICE.

CHARLES H. IRWIN, OF MARTINSVILLE, OHIO.

AUGER-BIT.

SPECIFICATION forming part of Letters Patent No. 361,522, dated April 19, 1887.

Application filed October 14, 1885. Renewed July 17, 1886. Serial No. 208,340. (No model.)

*To all whom it may concern:*

Be it known that I, CHARLES H. IRWIN, of Martinsville, in the county of Clinton and State of Ohio, have invented certain new and useful Improvements in Auger-Bits, of which the following is a full, clear, and exact description.

This invention, which is applicable alike both to hand and machine augers, consists in a solid center-stem auger-bit of special construction, substantially as hereinafter shown and described, the same including a solid center stem mounted or formed with a single convoluted blade throughout the main or greater length of it, terminating at its outer or lower end in a single chisel or knife edge cutter on one side of the stem, and a short additional convoluted blade at said end of the stem, terminating at its outer end in an additional chisel or knife edge cutter on the opposite side of the stem, thus forming a partially-double and a single twist central-stem auger-bit, said longer or extended convoluted blade having its upper or rear side made concave, substantially as hereinafter more fully set forth, and pointed out in the claim.

Reference is to be had to the accompanying drawings, forming a part of this specification, in which similar letters of reference indicate corresponding parts in all the figures.

Figure 1 represents a longitudinal view of an auger-bit embodying the invention; Fig. 2, a transverse section of the same upon the line *x x*, Fig. 1; Fig. 3, a front or under end view; and Fig. 4, a longitudinal section, upon a larger scale, of the screw-pointed end portion of the bit.

A indicates the solid center stem of the auger-bit, mounted or formed with a single convoluted blade, B, which is an integral portion of the bit and forms a quick screw-thread around the solid center stem, that terminates at its forward end in a gimlet-screw, *b*, the threads of which are perpendicular, or substantially so, to the central stem on their under or forward sides and slant downward or forward from the stem on their upper or rear sides, to give increased entering draft on the wood being bored, the slanting side of the threads taking the pressure, while their outer edge will be sharp or knife-like and have a constant tendency to cut downward or inward.

The advance end of the blade B has a sharp knife or cutting edge, *c*, and preferably, but not necessarily, a spread sharp lip or tooth, *d*, said cutter or cutting-edge being on one side of the stem only. This construction of the blade B is substantially similar to that described in Letters Patent No. 306,907, issued October 21, 1884; but said blade as here shown differs in one important respect, in being made concave on its upper or rear side, *e*, and flat or straight on its under or forward side, *e'*, only, whereby, while all necessary strength is secured, the concave upper or rear surface of the twist will serve to curl the chips inward toward the stem A and relieve them from pressing on the walls of the hole made by the bit, and will facilitate the discharge of the chips. This concave construction of the upper or rear surface of the twist is applicable to both single and double twist drills or bits.

Another short convoluted blade, B', is formed on the stem A at or near its advance end only, and which terminates at its outer end in an additional chisel or knife edge cutter, *c'*, on the opposite side of the stem A, such cutter either being made with or without a spread sharp lip or tooth, *d'*. This construction of the bit with a double cut and additional short twist at its outer or advance end only gives to the bit the same advantage as if it were a double-twist one throughout its whole length, producing a steadier or straighter action and easier cut, but free from that choking action by the chips which is incidental to a double-twist drill or bit, especially if formed or provided with a central stem, inasmuch as the additional convolute blade B' only extends for a short distance from the point of the bit, which leaves a free passage for the chips around the stem and up or along the single convoluted blade B. It also serves to stiffen and strengthen the bit where the strain is greatest.

Having thus fully described my invention, I claim as new and desire to secure by Letters Patent—

In a central-stem auger-bit, the central stem, A, provided with an extended convoluted blade, B, made concave, as at e, on its upper or back surfaces, and having a cutter, c, on one side of the stem, at its advance end, and a short convoluted blade, B', at the advance end of the stem, terminating in another cutter, c', on the opposite side of the stem, substantially as shown and described.

CHARLES H. IRWIN.

Witnesses:
GEORGE G. HARRIS,
ANNA H. BETTS.